United States Patent
Zack et al.

(10) Patent No.: US 7,840,476 B1
(45) Date of Patent: Nov. 23, 2010

(54) TRANSFORMATION BIDDING WITH TOOLING REQUIREMENTS

(75) Inventors: Matthew C. Zack, Pittsburgh, PA (US); Daniel Edwards, Oakmont, PA (US); David Becker, Sewickley, PA (US)

(73) Assignee: Ariba, Inc., Sunnyvale, CA (US)

( * ) Notice: Subject to any disclaimer, the term of this patent is extended or adjusted under 35 U.S.C. 154(b) by 2459 days.

(21) Appl. No.: 10/223,080

(22) Filed: Aug. 16, 2002

Related U.S. Application Data

(63) Continuation-in-part of application No. 09/282,157, filed on Mar. 31, 1999, now Pat. No. 7,249,085.

(51) Int. Cl.
*G06Q 40/00* (2006.01)
(52) U.S. Cl. .................................................. 705/37
(58) Field of Classification Search ............ 705/37
See application file for complete search history.

(56) References Cited

U.S. PATENT DOCUMENTS

| | | | |
|---|---|---|---|
| 3,581,072 A | 5/1971 | Nymeyer | |
| 3,863,060 A | 1/1975 | Rode et al. | |
| 4,597,045 A | 6/1986 | Kiuchi | |
| 4,674,044 A | 6/1987 | Kalmus et al. | |
| 4,789,928 A | 12/1988 | Fujisaki | |
| 4,799,156 A | 1/1989 | Shavit et al. | |
| 4,845,625 A | 7/1989 | Stannard | |
| 4,992,940 A | 2/1991 | Dworkin | |
| 5,136,501 A | 8/1992 | Silverman et al. | |
| 5,193,056 A | 3/1993 | Boes | |
| 5,243,515 A | 9/1993 | Lee | |
| 5,297,032 A | 3/1994 | Trojan et al. | |
| 5,375,055 A | 12/1994 | Togher et al. | |
| 5,394,324 A | 2/1995 | Clearwater | |
| 5,402,336 A | 3/1995 | Spiegelhoff et al. | |
| 5,606,602 A | 2/1997 | Johnson et al. | |
| 5,629,982 A | 5/1997 | Micali | |
| 5,640,569 A * | 6/1997 | Miller et al. ............ 710/241 |
| 5,664,115 A | 9/1997 | Fraser | |
| 5,684,963 A | 11/1997 | Clement | |
| 5,689,652 A | 11/1997 | Lupien et al. | |

(Continued)

FOREIGN PATENT DOCUMENTS

EP  0399850 A  11/1990

(Continued)

OTHER PUBLICATIONS

Rassenti et al.: A combinatorial auction mechanism for airport time slot allocation, Autumn 1982, The Bell Journal of Economics, vol. 13, No. 2, pp. 402-417.*

(Continued)

*Primary Examiner*—Hani Kazimi
*Assistant Examiner*—Bijendra K Shrestha
(74) *Attorney, Agent, or Firm*—Van Pelt, Yi & James LLP

(57) ABSTRACT

A system and method of transformation bidding in an electronic auction system. The system acquires lot data including tooling information for a lot, receives a bid from a bidder, and transforms the lot data and the bid into a true cost of procuring the lot from the bidder. The system also presents the true cost to a sponsor.

29 Claims, 9 Drawing Sheets

U.S. PATENT DOCUMENTS

| | | | |
|---|---|---|---|
| 5,715,402 A | 2/1998 | Popolo | |
| 5,727,165 A | 3/1998 | Ordish et al. | |
| 5,732,400 A * | 3/1998 | Mandler et al. | 705/26 |
| 5,758,327 A | 5/1998 | Gardner et al. | |
| 5,758,328 A | 5/1998 | Giovannoli | |
| 5,765,138 A | 6/1998 | Aycock et al. | |
| 5,774,873 A | 6/1998 | Berent et al. | |
| 5,794,207 A | 8/1998 | Walker et al. | |
| 5,794,219 A | 8/1998 | Brown | |
| 5,797,127 A | 8/1998 | Walker et al. | |
| 5,799,151 A | 8/1998 | Hoffer | |
| 5,799,285 A | 8/1998 | Klingman | |
| 5,802,502 A * | 9/1998 | Gell et al. | 705/37 |
| 5,803,500 A | 9/1998 | Mossberg | |
| 5,809,483 A | 9/1998 | Broka et al. | |
| 5,826,244 A | 10/1998 | Huberman | |
| 5,832,496 A | 11/1998 | Anand et al. | |
| 5,835,896 A | 11/1998 | Fisher et al. | |
| 5,862,223 A | 1/1999 | Walker et al. | |
| 5,890,138 A | 3/1999 | Godin et al. | |
| 5,897,621 A | 4/1999 | Boesch et al. | |
| 5,905,974 A | 5/1999 | Fraser et al. | |
| 5,905,975 A | 5/1999 | Ausubel | |
| 5,915,209 A | 6/1999 | Lawrence | |
| 5,966,699 A | 10/1999 | Zandi | |
| 6,014,627 A | 1/2000 | Togher et al. | |
| 6,021,398 A | 2/2000 | Ausubel | |
| 6,023,685 A | 2/2000 | Brett et al. | |
| 6,044,363 A | 3/2000 | Mori et al. | |
| 6,055,518 A | 4/2000 | Franklin et al. | |
| 6,058,379 A | 5/2000 | Odom et al. | |
| 6,061,663 A | 5/2000 | Bloom et al. | |
| 6,078,906 A * | 6/2000 | Huberman | 705/37 |
| 6,119,229 A | 9/2000 | Martinez et al. | |
| 6,151,589 A | 11/2000 | Aggarwal et al. | |
| 6,161,099 A | 12/2000 | Harrington et al. | |
| 6,199,050 B1 | 3/2001 | Alaia et al. | |
| 6,266,652 B1 | 7/2001 | Godin et al. | |
| 6,272,473 B1 * | 8/2001 | Sandholm | 705/37 |
| 6,366,891 B1 | 4/2002 | Feinberg | |
| 6,397,197 B1 * | 5/2002 | Gindlesperger | 705/37 |
| 7,124,106 B1 * | 10/2006 | Stallaert et al. | 705/37 |
| 7,225,152 B2 * | 5/2007 | Atkinson et al. | 705/37 |
| 7,249,085 B1 * | 7/2007 | Kinney et al. | 705/37 |
| 2007/0156575 A1 * | 7/2007 | Sandholm et al. | 705/37 |
| 2008/0071672 A1 * | 3/2008 | Rupp et al. | 705/37 |
| 2008/0133399 A1 * | 6/2008 | Rupp et al. | 705/37 |

FOREIGN PATENT DOCUMENTS

| | | |
|---|---|---|
| JP | 409101994 A | 4/1997 |
| JP | 410078992 A | 3/1998 |
| WO | WO 92/15174 | 9/1992 |
| WO | WO 97/37315 | 10/1997 |
| WO | WO 98/34187 | 8/1998 |
| WO | WO 99/63461 | 12/1999 |

OTHER PUBLICATIONS

Sullivan et al.: Electricity from coal and gas—Cost comparison, Dec. 1993, Power Engineering Journal, pp. 275-278.*
Kortanek et al.: Profit analysis and sequential bid pricing models, Nov. 1973, Management Science, vol. 20, No. 3, pp. 396-417.*
Andrews, "Auctions Catch the Interest of Hobbyists and Big Business", Aug. 24, 1998.
Associated Press, "Auction on Web is Buyer's Market", Apr. 6, 1998.
"BroadVision Developing First Interactive Commerce Management System To Support Online Sales & Marketing Process; New Software Category Necessary to Interactive Network Architecture", Business Wire, p5150152, May 15, 1995.
Danny Cohen, "Computerized Commerce", Information Processing 89, Aug. 28-Sep. 1, 1989.
"FairMarket Launches New Self-Serve Auctions", Business Wire, p6161495, Jun. 16, 1998.
Jahnke, "How Bazaar", CIO Web Business Magazine, Aug. 27, 1998.
Jean-Pierre Banatre, et al., "The Design and Building of Enchere, a Distributed Electronic Marketing System" Communications of the ACM, No. 1, Jan. 29, 1986.
Lee, "Do electronic marketplaces lower the price of goods?", Communications of the PCM, v41n1 pp. 73-80, Jan. 1998.
Malone, et al., "The Logic of Electronic Markets", Harvard Business Review, No. 893II, May-Jun. 1989.
"Moai Technologies Introduces New categories of Business to Business Auction Software . . . ", Business Editors and Computer Writers, Mar. 16, 1998.
Kikuchi, et al., "Multi-Round Anonymous Auction Protocols", IEICE Trans. Inf. & Syst., vol. E82-D, No. 4, Apr. 1999.
"Online bidding software", Electronic Buyers' News, Issue 1072, p. 86, 1/6p, Aug. 25, 1997.
Sairamesh, et al., "Economic Framework for Pricing and Charging Digital Libraries", D-Lip Magazine, Feb. 1996.
"Sold! . . . To the Lowest Bidder", Computer Finance, v6, n2, Jul. 1995.
"Venture Capitalists Fund Two Massachusetts Internet Related Companies", Boston Globe, Jan. 14, 1998.
Vigoroso, "Buyers prepare for brave new world of e-commerce", Purchasing, v126, n6, p. S4(1), Apr. 22, 1999.
Von der Fehr, et al., "Predatory bidding in sequential auctions", Oxford Economics Papers, v46, n3, p. 345(12), Jul. 1994.
"What you need to know to bid in FCC's narrowband auction", Washington Telecom News, v2, n26, p. 6(2), Jun. 27, 1994.
Wilder, "What's Your Bid?—FreeMarkets' real-time online bidding technology lets clients drive downcosts and improve product value", InformationWeek, Nov. 10, 1997.
Woolley, "E-muscle", Forbes, Mar. 9, 1998.
M. Reck, "Types of Electronic Auctions", Hochschule St. Gallen.
C. Wrigley, "Design Criteria For Electronic Market Servers", Electronic Markets, vol. 7, No. 4, 1997.
Wurman, et al., "The Michigan Internet AuctionBot: A Configurable Auction Server for Human and Software Agents", Artificial Intelligence Laboratory, University of Michigan, 1998.

* cited by examiner

Buyer's View

| Bidder | Bid Time | Bid (¢/M*Btu) |
|---|---|---|
| Sup A | 01:05:51 | 98.2 |
| Sup B | 01:06:08 | 97.4 |
| Sup D | 01:06:49 | 101.3 |
| Sup C | 01:08:10 | 96.7 |
| Sup B | 01:15:09 | 95.5 |
| Sup D | 01:17:38 | 97.2 |
| Sup B | 01:18:57 | 96.2 |
| Sup E | 01:20:03 | 97.1 |
| Sup A | 01:25:28 | 94.8 |

FIG. 5A

Supplier A's View

| Bidder | Bid Time | Bid ($/ton) |
|---|---|---|
| Sup A | 01:05:51 | 20.92 |
| Sup B | 01:06:08 | 20.00 |
| Sup D | 01:06:49 | 24.48 |
| Sup C | 01:08:10 | 19.20 |
| Sup B | 01:15:09 | 17.82 |
| Sup D | 01:17:38 | 19.77 |
| Sup B | 01:18:57 | 18.62 |
| Sup E | 01:20:03 | 19.66 |
| Sup A | 01:25:28 | 17.01 |

FIG. 5B

Supplier B's View

| Bidder | Bid Time | Bid ($/ton) |
|---|---|---|
| Sup A | 01:05:51 | 20.00 |
| Sup B | 01:06:08 | 19.01 |
| Sup D | 01:06:49 | 23.83 |
| Sup C | 01:08:10 | 18.15 |
| Sup B | 01:15:09 | 16.67 |
| Sup D | 01:17:38 | 18.77 |
| Sup B | 01:18:57 | 17.53 |
| Sup E | 01:20:03 | 18.64 |
| Sup A | 01:25:28 | 15.80 |

| AMORTIZE? | SUPPLIER 3 | $ 833,715.00 | | | | TOTAL COST | | SAVINGS | |
|---|---|---|---|---|---|---|---|---|---|
| FALSE | TOOLING EXPENSE | $ | 28,400 | $0 | ##### | | | | |
| FALSE | MOVING EXPENSE | $ | - | $0 | $ - | YEAR 1 | $ 1,030,565.67 | $ | 305,501.33 |
| FALSE | INSURANCE EXPENSE | $ | - | $0 | $ - | YEAR 2 | $ 801,649.04 | $ | 483,030.77 |
| FALSE | PPAP | $ | 1,000 | $0 | $1,000 | YEAR 3 | $ 770,816.38 | $ | 464,452.66 |
| FALSE | OTHER | $ | - | $0 | $ - | TOTAL | $ 2,603,031.09 | $ | 1,252,984.77 |
| | YR 1 LOST SAVINGS TO IMPLEMENT | | 445,356 | | | | | | |
| AMORTIZE? | SUPPLIER 4 | $ 859,968.00 | | | | TOTAL COST | | SAVINGS | |
| FALSE | TOOLING EXPENSE | $ | 60,000 | $0 | ##### | | | | |
| FALSE | MOVING EXPENSE | $ | - | $0 | $ - | YEAR 1 | $ 1,079,667.67 | $ | 256,399.33 |
| FALSE | INSURANCE EXPENSE | $ | - | $0 | $ - | YEAR 2 | $ 826,892.31 | $ | 457,787.50 |
| FALSE | PPAP | $ | 1,000 | $0 | $1,000 | YEAR 3 | $ 795,088.76 | $ | 440,180.29 |
| FALSE | OTHER | $ | - | $0 | $ - | TOTAL | $ 2,701,648.73 | $ | 1,154,367.12 |
| | YR 1 LOST SAVINGS TO IMPLEMENT | | 445,356 | | | | | | |
| AMORTIZE? | SUPPLIER 5 | $ 875,000.00 | | | | TOTAL COST | | SAVINGS | |
| FALSE | TOOLING EXPENSE | $ | 60,000 | $0 | ##### | | | | |
| FALSE | MOVING EXPENSE | $ | - | $0 | $ - | YEAR 1 | $ 1,089,689.00 | $ | 246,378.00 |
| FALSE | INSURANCE EXPENSE | $ | - | $0 | $ - | YEAR 2 | $ 841,346.15 | $ | 443,333.65 |
| FALSE | PPAP | $ | 1,000 | $0 | $1,000 | YEAR 3 | $ 808,986.69 | $ | 426,282.36 |
| FALSE | OTHER | $ | - | $0 | $ - | TOTAL | $ 2,740,021.84 | $ | 1,115,994.01 |
| | YR 1 LOST SAVINGS TO IMPLEMENT | | 445,356 | | | | | | |
| AMORTIZE? | SUPPLIER 6 | $ 1,129,000.00 | | | | TOTAL COST | | SAVINGS | |
| FALSE | TOOLING EXPENSE | $ | 30,000 | $0 | ##### | | | | |
| FALSE | MOVING EXPENSE | $ | - | $0 | $ - | YEAR 1 | $ 1,182,001.28 | $ | 154,065.72 |
| FALSE | INSURANCE EXPENSE | $ | - | $0 | $ - | YEAR 2 | $ 1,085,576.92 | $ | 199,102.88 |
| FALSE | PPAP | $ | 500 | $0 | $500 | YEAR 3 | $ 1,043,823.96 | $ | 191,445.08 |
| FALSE | OTHER | $ | - | $0 | $ - | TOTAL | $ 3,311,402.17 | $ | 544,613.69 |
| | YR 1 LOST SAVINGS TO IMPLEMENT | | 145,186 | | | | | | |

FIG. 7 (Cont.)

TRANSFORMATION BIDDING WITH TOOLING REQUIREMENTS

CROSS REFERENCE TO RELATED APPLICATION

This application is a continuation-in-part of U.S. patent application Ser. No. 09/282,157, entitled "Method and System for Conducting Electronic Auctions with Multi-Parameter Price Equalization Bidding," filed on Mar. 31, 1999 now U.S. Pat. No. 7,249,085 in the name of Sam E. Kinney, Jr., Vincent F. Rago, Glen T. Meakem, Robert G. Stevens, David J. Becker, Anthony F. Bernard, William D. Rupp, Daniel C. Heckmann, Julia L. Rickert, Shane M. Tulloch, Jennifer L. Riddle, Nikki A. Sikes, and John P. Levis, III, and assigned to the assignee of the present Application, FreeMarkets, Inc.

FIELD OF THE INVENTION

The invention relates generally to conducting online electronic auctions, and in particular, to business-to-business auctions.

BACKGROUND OF THE INVENTION

Procurement and Sourcing Models

It is believed that procurement of goods and services has traditionally involved high transaction costs. The cost of finding and qualifying potential bidders has been particularly high. The advent of electronic commerce, however, has introduced new methods of procurement that lower some of the transaction costs associated with procurement. Electronic procurement, and in particular business-to-business electronic procurement, matches buyers and suppliers and facilitates transactions that take place on networked systems.

Supplier-bidding auctions for products and services defined by a buyer have been developed. In a supplier-bidding auction, bid prices may start high and move downward in reverse-auction format as suppliers interact to establish a closing price. The auction marketplace is often one-sided, i.e., one buyer and many potential suppliers. It is believed that, typically, the products being purchased are components or materials. "Components" may mean fabricated tangible pieces or parts that become part of assemblies of durable products. Example components include gears, bearings, appliance shelves, or door handles. "Materials" may mean bulk quantities of raw materials that are further transformed into product. Example materials include corn syrup or sheet steel.

Industrial buyers may not purchase one component at a time. Rather, they may purchase whole families of similar components in order to achieve economic means of scale. These items may therefore be grouped into a single lot. Suppliers in industrial auctions may provide unit price quotes for all line items in a lot.

Auction Process

In many types of business transactions, price may not be the sole parameter upon which a decision is made. For example, in the negotiations for a supply contract, a buyer may compare various proposals not only on the basis of price but also on the basis of the non-price characteristics of non-standard goods, the location of the supplier, the reputation of the supplier, etc. In a typical business-to-business situation, a plurality of parameters or cost components may be considered in combination with the supplier's price proposal.

In these situations, purchasers may negotiate with each supplier independently because multi-parameter bids may not be readily compared. Actual comparisons by the purchaser may be based on a combination of subjective and objective weighting functions. Bidders may not have access to information on the buyer-defined weighting functions. At most, bidders may be selectively informed (at their disadvantage) of aspects of other competing bids.

Thus, it is believed that there is a need for system and method of providing a competitive auction for goods or services that traditionally could not take advantage of natural auction dynamics. In particular, it is believed that there is a need for system and method of providing an auction where a buyer can determine the true cost of procuring a lot having several components from a particular supplier, using the real-time transformation of multi-parameter factors into comparative units of measure.

SUMMARY OF THE INVENTION

The present invention is directed to a system and method of transformation bidding in an electronic auction system. The system acquires lot data including tooling information for a lot, receives a bid from a bidder, and transforms the lot data and the bid into a true cost of procuring the lot from the bidder. The system also presents the true cost to a sponsor.

The present invention is also directed to a method of transformation bidding in an electronic auction system having at least one bidder competing for a lot. The method comprises acquiring lot data including a total number of tools required to procure the lot where the total number of the tools includes at least one of a new tool and a tool to be transferred, receiving a bid from the bidder, and transforming the lot data and the bid into a true cost of procuring the lot from the bidder where the transforming comprises utilizing a modular function having at least one of a simulation model, a statistical model, and an optimization model. The method also comprises presenting the true cost via providing at least one of a hard copy and a graphical user interface.

The present invention is also directed to an electronic auction system for transformation bidding. The system includes means for acquiring lot data including tooling information for a lot, means for receiving a bid from a bidder, means for transforming the lot data and the bid into a true cost of procuring the lot from the bidder.

The present invention is also directed to an electronic auction system for transformation bidding. The system includes a database that stores tooling information. The system also includes a processor that acquires lot data, including the tooling information for a lot, receives a bid from a bidder, transforms the lot data and the bid into a true cost of procuring the lot from the bidder, and presents the true cost to a sponsor.

The present invention is also directed to a machine readable medium for transformation bidding in an electronic auction system. The machine readable medium comprises a first machine readable code that acquires lot data where the lot data includes tooling information for the lot, a second machine readable code that receives a bid from a bidder, a third machine readable code that transforms the lot data and the bid into a true cost of procuring the lot from the bidder, a fourth machine readable code that presents the true cost to a sponsor.

BRIEF DESCRIPTION OF THE DRAWINGS

The accompanying drawings, wherein like reference numerals are employed to designate like parts or steps, are included to provide a further understanding of the invention, are incorporated in and constitute a part of this specification, and illustrate embodiments of the invention that together with the description serve to explain the principles of the invention.

In the drawings:

FIGS. 5A-C are bid history charts based upon buyer and supplier viewpoints;

FIG. 7 depicts an exemplary graphical user interface display, in accordance with the present invention.

DETAILED DESCRIPTION OF THE EMBODIMENTS

Reference will now be made in detail to the preferred embodiments of the present invention, examples of which are illustrated in the accompanying drawings. It is to be understood that the Figures and descriptions of the present invention included herein illustrate and describe elements that are of particular relevance to the present invention, while eliminating, for purposes of clarity, other elements found in typical auction systems and computer networks.

The present invention provides a system and method of providing an auction, where a buyer can determine the true cost of procuring a lot, including several components from a particular supplier, using the real-time transformation of multi-parameter factors into comparative units of measure. In accordance with one aspect of the present invention, the system uses lot data and bid data and transforms them into cost data. Cost data shows the true cost of procuring the lot from the particular supplier.

The following description of the features of the present invention is presented in the context of downward-based (i.e., reverse) online industrial auctions. However, as would be appreciated by one of ordinary skill in the relevant art, these inventive features could also be applied in the context of upward-based (i.e., forward) online auctions. Furthermore, as is apparent from the following description, the inventive features of the present invention can be applied in non-auction settings.

Figure 1A:
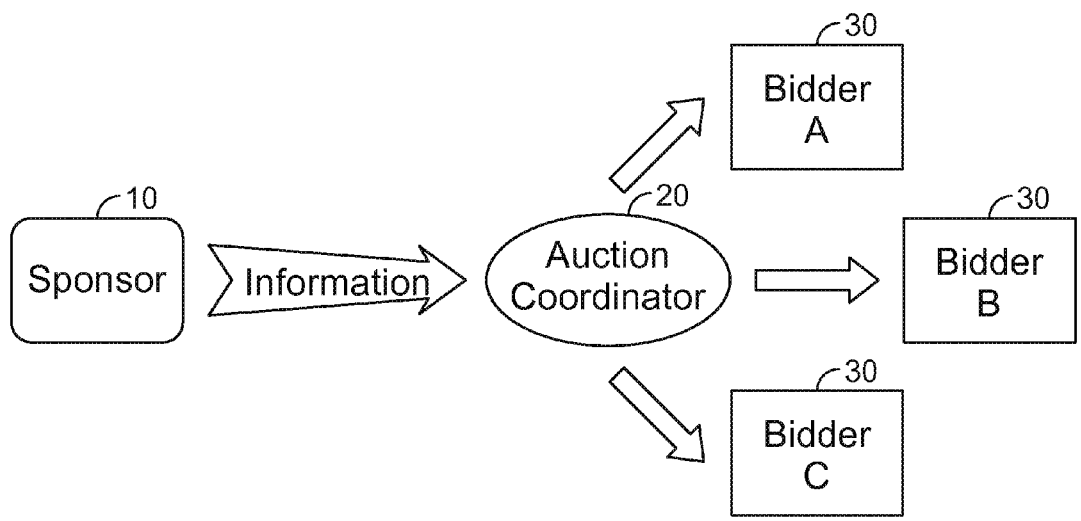
FIG. 1A is a flow diagram of a request for quotation in an auction.
Figure 1B:
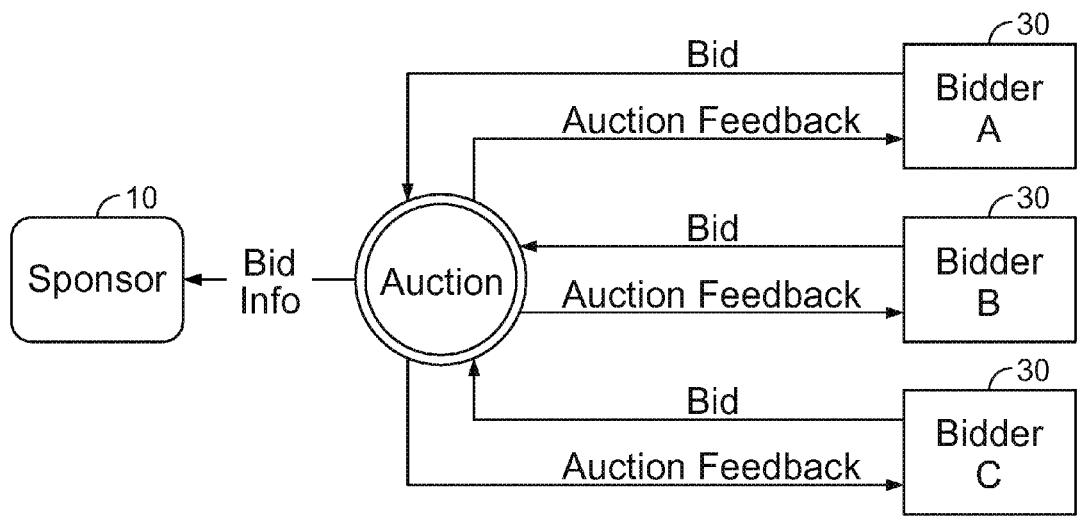
FIG. 1B is a flow diagram of a bidding process in an auction.
Figure 1C:
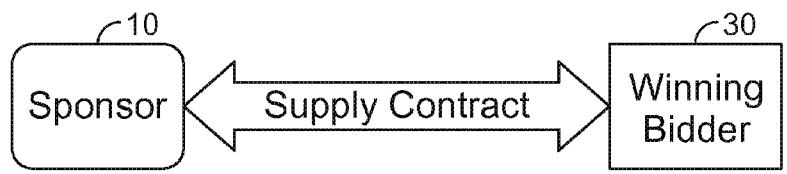
FIG. 1C is a flow diagram of a contract award following an auction.

The basic process for a purchaser sponsored supplier-bidding or reverse auction, as conducted by the assignee of the present invention, is described below with reference to FIGS. 1A-1C. FIGS. 1A-1C illustrate the functional elements and entities involved in setting up and conducting a typical supplier-bidding auction. FIG. 1A illustrates the creation of an auctioning event, FIG. 1B illustrates the bidding during an auction, and FIG. 1C illustrates the results after completion of a successful auction.

In the supplier-bidding reverse auction model, the product or service to be purchased is, preferably, defined by the buyer or sponsor 10 of the auction, as shown in FIG. 1A. Alternatively, the sponsor may set up all or some of its own bidding events and find its own suppliers. In that case, the sponsor 10 would run the events through a market operations center, which is a facility where auctions are monitored and participants receive assistance. If the sponsor 10 decides to use the auctioning system of the present invention to procure products or services, the sponsor 10 may provide information to an auction coordinator 20. That information may include, among others, information about incumbent suppliers and historic prices paid for the products or services to be auctioned. In particular, the sponsor 10 may provide lot data to auction coordinator 20. In accordance with one aspect with the present invention, the lot data includes, among others, information relating to tooling requirements for the lot.

Preferably, the sponsor 10 also works with the auction coordinator 20 to define the products and services to be purchased in the auction and to assign the products and services to an appropriate lot so that desired products and services can be procured using optimal auction dynamics. A specification may then be prepared for each desired product or service, and a Request for Quotation ("RFQ") may be generated for the auction.

Next, the auction coordinator 20 identifies potential suppliers, or bidders 30, preferably, with input from the sponsor 10, and invites the potential suppliers 30 to participate in the upcoming auction. The suppliers 30 that are selected to participate in the auction may become bidders 30 and may be given access to the RFQ, typically through an RFQ in a tangible form, such as on paper or in an electronic format.

As shown in FIG. 1B, during a' typical auction, bids are made for one or more lots, where each lot includes several components or parts. As noted above, the components or parts in a lot may be further classified into several similar line items. Although bidders 30 may submit actual unit prices for all line items within a lot, the competition in an auction is typically based on the aggregate value bid for all line items within a lot. The aggregate value bid for a lot may, therefore, depend on the level and mix of line item bids and the quantity of goods or services that are offered for each line item. Thus, bidders 30 submitting bids at the line item level may actually be competing on the lot level. During the auction, the sponsor 10 may monitor the bidding as it occurs. Bidders 30 may also be given market feedback during the auction so that they may bid competitively.

After the auction, the auction coordinator 20 analyzes the auction results with the sponsor 10. The sponsor 10 may conduct final qualification of the low bidding supplier or suppliers 30. The sponsor 10 may furthermore retain the right not to award business to a low bidding supplier 30 based on final qualification or other business concerns. As shown in FIG. 1C, a supply contract may be drawn up for the winning bidder 30 and executed based on the results of the auction.

The auction may be conducted electronically between bidders 30 at their respective remote sites and the auction coordinator 20 at its site. Alternatively, instead of the auction coordinator 20 managing the auction at its site, the sponsor 10 may perform auction coordinator tasks at its site.

Figure 2:
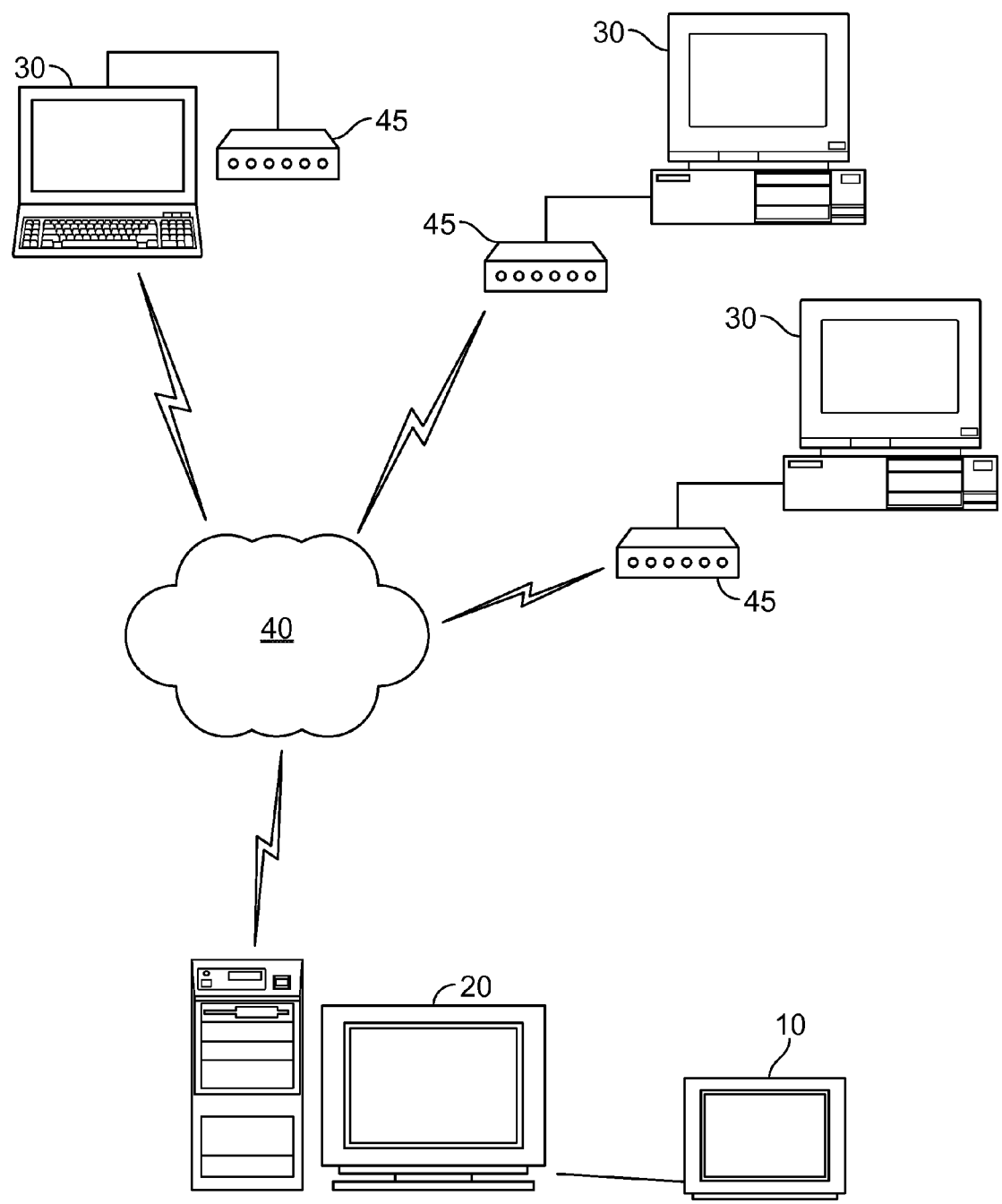
FIG. 2 is a schematic illustration of communications links between the coordinator, the buyer, and the suppliers in an auction.

Information is conveyed between the coordinator 20 and the bidders 30 via any communications medium. As shown in FIG. 2, using a computer system, bidders 30 may be connected to the auction via network 40. Note that network 40 may be any type of network systems such as a Local Area Network, Wide Area Network, or even a global network, such as the Internet. For example, using a computer system coupled to a modem 45, bidders 30 may connect to the auction via an existing dial-up telephone line. Alternatively, sponsors 10 and bidders 30 may be coupled to the auction by communicating directly with the auction coordinator 20 through a public switched telephone network, a wireless network, or any other connection.

Figure 3:
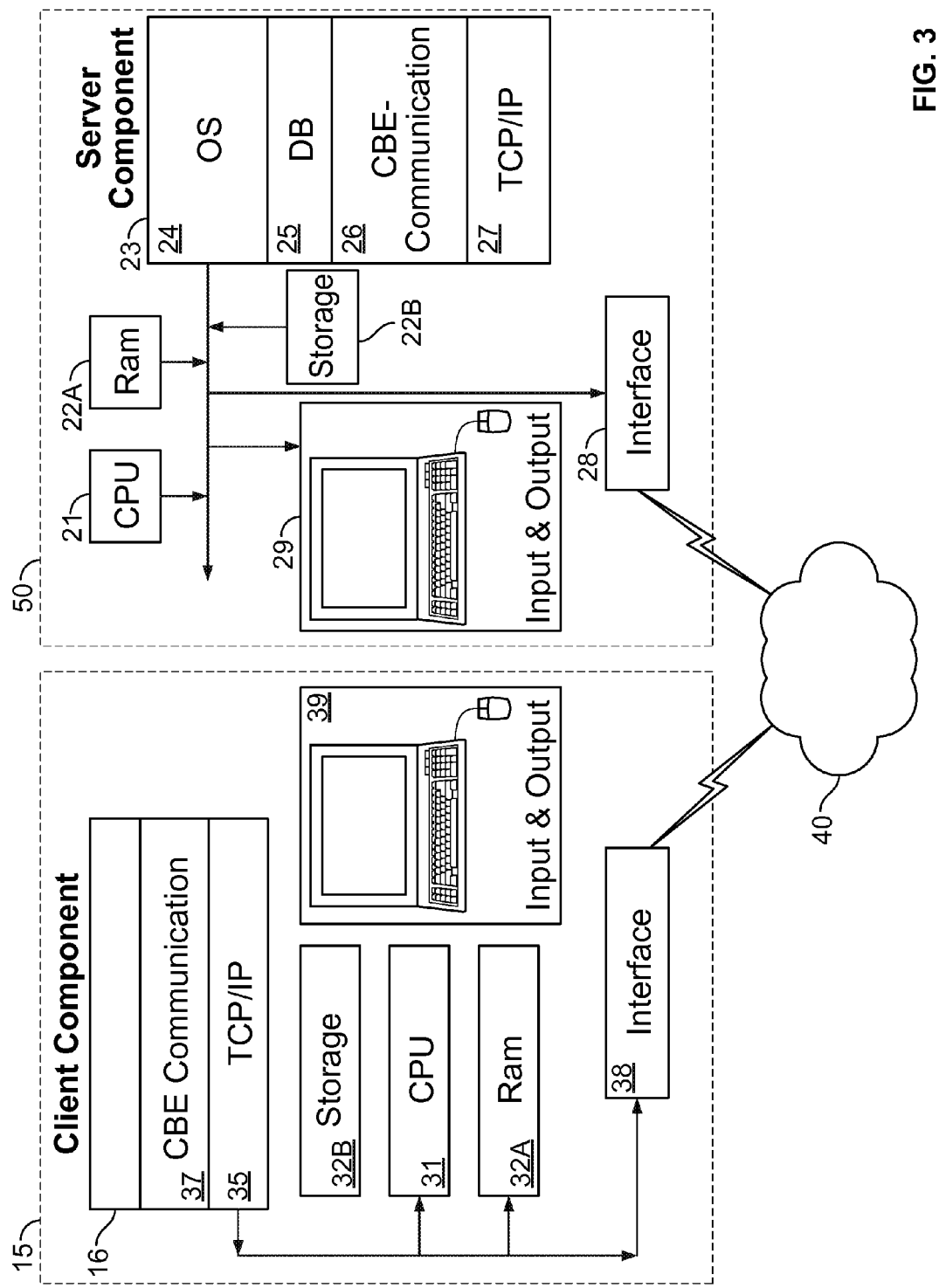
FIG. 3 is a schematic illustration of auction software and computers hosting that software in an auction.

In accordance with one aspect of the present invention, a computer software application is used to manage the auction. Preferably, as shown in FIG. 3, the computer software application has two computer systems 15 and 50, each having its own component: a client component 16 and a server component 23, respectively. Computer systems 15 and 50 are used by bidder 30 and auctioneer 20 or sponsor 10, respectively, to conduct an online auction over network 40.

The client component 16 may operate on a computer at the site of any one of the bidders 30. Bidders 30 make bids during the auction using the client component 16. The bids is sent via network 40 to the site of the coordinator 20, where it is received by server component 23 of the software application. The client component 16 may include software used to make a connection through telephone lines, cables or the Internet to the server component 23. Bids may be submitted over this connection and updates may be sent to the connected suppliers.

In one embodiment of the present invention, bids are submitted by using the client component 16 of the application only. This ensures that buyers do not circumvent the bidding process and that only invited suppliers participate in the bidding. In accordance with one aspect of the present invention, bidders 30 see their bids and bids placed by other suppliers for each lot on the client component 16. When a bidder 30 submits a bid, that bid is sent to the server component 23 and evaluated to determine whether the bid is from an authorized bidder and whether the bid has exceeded a predetermined maximum acceptable price. In accordance with one aspect of the present invention, a bid placed by a supplier is broadcast to all connected bidders, thereby enabling every participating bidder to quickly view the change in market conditions and begin planning their competitive responses.

The embodiments of the invention may be implemented by a processor-based computer system 50. Computer system 50 includes one or more databases 25 for receiving and storing bid information from bidders 30 and software for, among other things, determining or updating market positions of the bidders 30 and displaying feedback information. Alternatively or additionally, in one embodiment, storage 22B provides the functionality of databases 25.

As shown in FIG. 3, in accordance with one aspect of the present invention, computer system 50 operates to execute the functionality for server component 23. Computer system 50 includes a processor 21, a memory 22A and a disk storage 22B. Memory 22A stores computer program instructions and data. Processor (or CPU) 21 executes the program instructions or software, and processes the data stored in memory 22A. Disk storage 22B stores data to be transferred to and from memory 22A. Note that disk storage 22B can be used to store data that is typically stored in databases 25. Computer system 50 further includes I/O device 29 for entering input data and for receiving output data. I/O device 29 can be any I/O device such as a keyboard, mouse, monitor, facsimile, or any other similar device. These and other types of I/O devices will be apparent to those skilled in the art and are within the scope of the present invention.

All of these elements are interconnected by one or more buses (or other means of interconnects), which allows data to be intercommunicated between the elements. Note that memory 22A is accessible by processor 21 over a bus and includes an operating system, a program partition and a data partition. The program partition stores and allows execution by processor 21 of program instructions that implement the functions of each respective system described herein. The data partition is accessible by processor 21 and stores data used during the execution of program instructions.

For purposes of this application, memory 22A and disk 22B are machine readable mediums and could include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM), optical fiber, electrical signals, lightwave signals, radio-frequency (RF) signals and any other device or signal that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. Further, system 50 may contain various combinations of machine readable storage devices, which are accessible by processor 21 and which are capable of storing a combination of computer program instructions and data.

Computer system 50 also includes a network interface 28. Network interface 28 may be any suitable means for controlling communication signals between network devices using a desired set of communications protocols, services and operating procedures. Communication protocols are layered, which is also referred to as a protocol stack, as represented by operating system 24, a CBE-communication layer 26, and a Transport Control Protocol/Internet Protocol (TCP/IP) layer 27. Network interface 28 also includes connectors for connecting interface 28 with a suitable communications medium. Those skilled in the art will understand that network interface 28 may receive communication signals over any suitable medium such as twisted-pair wire, co-axial cable, fiber optics, radio-frequencies, and so forth.

FIG. 3 further shows computer system 15 that operates to execute the functionality for client component 16. As shown, computer system 15 includes a processor (or CPU) 31, memory 32A, disk storage 32B, network interface 38, I/O device 39, and a protocol stack having a CBE-communication layer 37 and TCP/IP layer 35. These elements operate in a manner similar to the corresponding elements for computer system 50, and as such, are not described further herein.

Referring again to the basic procurement process for a purchaser sponsored supplier-bidding or reverse auction, as referenced in FIGS. 1A-1C, when the auction concludes, the lowest bidding bidder generally becomes the winning bidder. As noted above, the bid price of the lot may not be the sole cost upon which a decision is made—other cost components (i.e., multiple parameters such as tooling cost and long term cost) associated with procuring a lot from a particular supplier should be considered. Comparison of multi-parameter bids, however, cannot be realized unless the relative impact (or weighting) of each of the individual bidding parameters is known. Intuition that is based on subjective assessments (or valuations) of multiple bid parameters cannot create an efficient market because subjective assessments are inconsistently applied and applied after lengthy delays. Multi-parameter bid transformation enables true auction competition because it forces a greater degree of objectivity into the valuation process and is accomplished in real-time, allowing an auction dynamic to occur. Comparison of bids can therefore be accomplished in accordance with one or more comparative bid parameters.

Figure 4:
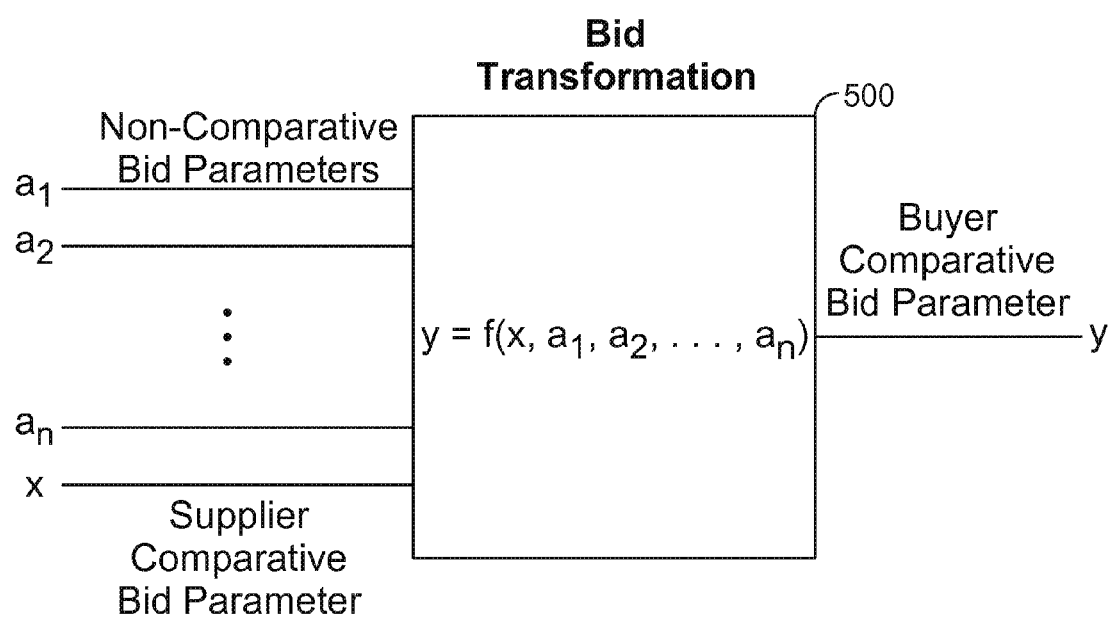
FIG. 4 is a schematic illustration of a bid transformation function.

One embodiment of transformation mechanism is illustrated in FIG. 4. As shown, bid transformation 500 represents a function (f) that is operative on input variables (x) and ($a_1$ . . . $a_n$). Input variables ($a_1$ . . . $a_n$) represent non-comparative bid parameters, while input variable (x) represents a supplier comparative bid parameter (e.g., price). The output of bid transformation 500 is the buyer comparative bid parameter (y).

In one embodiment, the bid transformation function (f) is a linear or non-linear analytic function that is calculated in real-time. In another embodiment, the bid transformation function (f) is a linear or non-linear function that is implemented via reference (i.e., lookup) tables. In yet another embodiment, the transformation function is a combination of an analytic linear function, analytic non-linear function, and table lookup function. The combination can be nested more than one layer deep.

As shown in the embodiment of the transformation process of FIG. 4, two types of comparative bid parameters exist. A buyer comparative bid parameter (y) refers to a parameter, resulting from the transformation process, upon which the buyer will compare competing bids. As described further below, the buyer comparative bid parameter (y) provides comparative units of measure that can be used to compare a plurality of bidders or suppliers. A supplier comparative bid parameter (x), on the other hand, refers to an input to the transformation function (f). As will be described in greater detail below, the supplier comparative bid parameter can be used by a supplier to compare competing bids in the supplier's context. In one embodiment, a plurality of the supplier comparative bid parameters (x) may be used. In another embodiment, the supplier comparative bid parameter may not be used because all parties may be allowed to view the auction in the buyer's context.

As noted, non-measurable or quantitatively non-comparative bid parameters (e.g., non-financial factors and other non-comparative cost components) are also used as inputs to the transformation process. Unlike supplier comparative bid parameters, non-comparative bid parameters (e.g., time or interest rate) are not directly used to compare competing bids. Using inventive features of the present invention, these parameters may be transformed into comparative units of measure. In this transformation framework, a supplier comparative bid parameter value can be modified by the transformation process based upon non-comparative bid parameter values to yield a buyer comparative bid parameter value.

Where a single buyer comparative bid parameter (e.g., true cost of procuring a lot from a particular supplier) is output by the transformation process, competition between bids is based on the relative magnitude of the values of the buyer comparative bid parameter associated with each of the bidders. This relative magnitude of the comparative bid parameters can be illustrated on a one-dimensional plot. Where multiple buyer comparative bid parameters are output by the transformation process, competition between bids can be reviewed using a multiple dimensional plot. In most cases, the use of a single buyer comparative bid parameter is advantageous because it provides the simplest means for all parties to unambiguously determine a relative ranking of bids.

The present invention creates true competition among suppliers in an auction system that enables comparison of truly disparate bids. As is apparent based on the foregoing description, while traditional auctions focus on bid price as the sole variable of online competition, the present invention also factors in non-bid price variables into the bid evaluation and award process.

An exemplary application of the concepts and features of the present invention is illustrated herein in the context of a particular application within the coal market. Coal purchase decisions are based on a variety of factors relating to the characteristics of the coal, as well as the characteristics of the buyer's needs and physical facilities. Characteristics of the coal include factors such as thermal content (BTU/lb), percentage sulfur, percentage ash, percentage water/moisture, hardness, etc. Relevant characteristics of the buyer include the time frame of required delivery, types of power generation units, etc.

During negotiations with multiple coal suppliers, each of the relevant factors are evaluated in combination to determine the relative attractiveness of each of the received bids. The evaluation process is often a combination of subjective judgment, based on instinct and experience, and hard quantitative analysis. As one can readily appreciate, this evaluation process, although typical, is time consuming and adds great uncertainty for the suppliers.

Time delays are inherent since each supplier is negotiated with independently. Suppliers face great uncertainty in this process because the internal subjective/quantitative metrics used by the buyer in the evaluation process are inconsistently applied. Negotiation tactics dictate that the subjective/quantitative metrics used by the buyer are not provided to the suppliers. This confidential information gives the buyer leverage in altering the supplier's perception of the relative attractiveness of the submitted bid. During the negotiation process, suppliers may be selectively informed (at their disadvantage) of aspects of the decision making process.

Limited communication of information to the suppliers limits the potential of true competition between the suppliers. The absence of competition lowers the likelihood that the suppliers will approach their best offer.

In the coal market example, the buyer may be ultimately interested in the price per unit energy produced when the coal is processed through a power generation unit. As noted, all coal is not created equal. The characteristics of the particular coal being offered by a supplier are unique to the supplier. Moreover, different power generation units will produce different quantities of energy from identical coal, due to engineering differences built into the power generation units.

Bids for coal are typically submitted on a price per physical measure of weight or volume (e.g., $/ton) basis. The raw $/ton bids of the participating suppliers cannot be readily compared to each other due to the underlying characteristics of the coal. A mechanism is therefore required to transform each of the bids into a context that enables an apples-to-apples comparison such that the buyer can choose the most competitive bid. In the coal market example, the transformation process is designed to transform the $/ton bids for unique lots of coal into standardized units of value to the buyer (e.g., price-per-unit-of-energy bids such as ¢/Million BTU). After all of the $/ton bids are transformed into ¢/Million BTU bids, the buyer can readily identify the market leading bids.

It should be noted that the standardized units of value to the buyer can include various forms, such as a cost per unit of thermal content from the coal, a cost per unit of electrical energy output from a generation facility burning the coal, the revenue from selling electrical energy output of a generation facility burning the coal, a measure of profit contribution from selling electrical energy output of a generation facility burning the coal, a measure of the net present value of a decision to accept the coal, wherein the decision is modeled to take into account the overall improvement in the buyer's economic condition, including revenue generated, costs avoided, risks mitigated, or asset valuation improved.

The latter example is a function that implements the notion that accepting a certain coal bid might have a portfolio effect on the buyer's overall situation, or might change the economics of a certain project. For example, a buyer might be considering whether to build a new power plant, and since coal is a high percentage of the life cycle cost of the power plant, changes in the price of coal offered to the buyer might change the overall value of the plant.

The transformation function used in the coal market has been modeled as a linear transformation. In this linear transformation, a supplier's raw $/ton bid is modified using multiplicative and additive adjustments (or factors) to yield a ¢/Million BTU bid. Each of the multiplicative and additive factors are based upon characteristics (e.g., coal characteristics, delivery specifications, etc.) of a submitted bid.

In accordance with one aspect of the present invention, the characteristics of a supplier's coal might have been identified prior to the start of the auction. In this case, multiplicative and additive factors are determined prior to the start of the auction and stored in memory by server component 23 (shown in FIG. 3). During the auction process, the multiplicative and additive factors are retrieved from memory and used to transform the raw $/ton bid into a ¢/Million BTU bid. In one embodiment, a multiplicative and/or additive factor is stored by server component 23 for each of the characteristics of the supplier's coal. In an alternative embodiment, a single multiplicative factor and a single additive factor, representative of the cumulative effect of the characteristics of the coal in the linear transformation, is stored.

In accordance with one aspect of the present invention, the characteristics of a supplier's coal can be provided as part of a supplier's first submitted bid along with the raw $/ton bid to server component 23. In this case, the characteristics of the supplier's coal (i.e., BTU/lb, % sulfur, % ash, % water, etc.) would be fed by server component 23 into the transformation function to determine, in real-time, the buyer comparative bid parameter that is the result of the transformation function. Server component 23 may store the net result of the transformation function factors in memory for retrieval in the transformation of future bids by that supplier.

The transformation process in the coal market example can be generically characterized by the transformation process illustrated in FIG. 4. In the coal market example, the output of the transformation process (i.e., buyer comparative bid parameter or "y") is the ¢/Million BTU parameter. The ¢/Million BTU parameter represents the basis upon which a buyer will compare the bids submitted by the participating suppliers. Accordingly, the ¢/Million BTU parameter represents a buyer comparative bid parameter.

In the coal example, the transformation process takes as inputs both comparative and non-comparative bid parameters. The non-comparative bid parameters represent the characteristics of the coal (i.e., BTU/lb, % sulfur, % ash, % water, delivery time, etc.) and the characteristics of the buyer. The $/ton bid price parameter represents a supplier comparative bid parameter. In combination, the comparative and non-comparative bid parameters are used by the transformation function (f) to yield the buyer comparative bid parameter value in ¢/Million BTU.

Note that the supplier comparative bid parameter ($/ton) is significant because it enables the supplier to view a relative comparison of bids in the supplier's individual context. This feature of the present invention will be described in greater detail below in the discussion of the detransformation and feedback parts of the auction process.

After each of the submitted bids has been transformed into the buyer comparative bid parameter, ¢/Million BTU, an "apples-to-apples" comparison can be performed. The "apples-to-apples" comparison can be effected in any of a variety of ways, including the bid history chart of FIG. 5A. The bid history chart of FIG. 5A illustrates a relative ranking of transformed received bids in ¢/Million BTU.

Having received a bid from a participating supplier, the auction server must then broadcast market feedback to the other participating suppliers. This broadcast function creates a real-time online competition between suppliers who are able to view the activities of their competitors and plan their corresponding response strategy.

In the coal market, the specific factors used in the transformation function can be confidential to the buyer. Accordingly, the buyer may want to prevent the suppliers from gaining insight into aspects of the transformation function that quantifies the buyer's weighting of various parameters associated with a supplier's bid. For this reason, in accordance with one aspect of the present invention, the auction server does not provide feedback for the transformed bids to the participating suppliers. Rather, the auction server broadcasts bids that have been detransformed from the buyer comparative bid parameter (i.e., ¢/Million BTU) into the context (i.e., $/ton) of the individual suppliers.

As noted, the $/ton bid for a supplier is referred to as the supplier comparative bid parameter (or "x"). Also, as noted and illustrated in FIG. 4, the supplier comparative bid parameter is one of the inputs into the transformation function (f). The supplier comparative bid parameter is significant because it enables the supplier to view the auction competition in its own context. In other words, a supplier can view all competing bids as if all suppliers were offering the same type of coal for sale. In this manner, a supplier can view the competitive auction landscape without receiving any information concerning the transformation function that has been defined by the buyer.

In the coal example, the transformation process is modeled as a linear function, having at least one multiplicative factor and/or at least one additive factor. This transformation can be represented by the well-known algebraic function $y=mx+b$, where m is the multiplicative factor, b is the additive factor, x is the supplier comparative bid parameter, and y is the buyer comparative bid parameter. Bids viewed in the buyer's context have been converted into the buyer comparative bid parameter (i.e., ¢/Million BTU).

On the supplier side, in accordance with one aspect of the present invention, each of the bids submitted from other participating suppliers is detransformed from the buyer comparative bid parameter into the supplier comparative bid parameter. In one embodiment, this detransformation is accomplished by solving the formula for x to yield the formula $x=(y-b)/m$. In this detransformation process, ¢/Million BTU bid values that are to be broadcast to Supplier A are converted to $/ton bid values using the multiplicative and/or additive factors for Supplier A.

After client component 16 at Supplier A receives the detransformed bid values, Supplier A is then able to view a relative comparison of the bids in its own context. This relative comparison corresponds to the relative comparison of the bids in the buyer context. FIG. 5B illustrates a bid history chart in the context of Supplier A. In this example, it is assumed that Supplier A's multiplicative and additive factors are, m=0.87 and b=80, respectively.

As FIG. 5B demonstrates, Supplier A can view the competitive climate of the auction without having access to any of the details of the transformation function (f) implemented by the buyer. From Supplier A's perspective, all other suppliers are bidding on the same type of coal. Competition is therefore perceived as being based on the $/ton price, not the ¢/Million BTU price. If Supplier A decides to beat the market leading bid, Supplier A would simply reduce his $/ton bid and submit the new bid (e.g., bid of $17.01/ton bid at 01:25:28) to the auction server. The new $17.01/ton bid would then be transformed into a 94.8 ¢/Million BTU bid (i.e., 0.87*17.01+ 80=94.8 ¢/Million BTU) using the multiplicative and additive adjustments for Supplier A.

In a similar manner, Supplier B can also view the competitive climate of the auction without having access to any of the details of the transformation function implemented by the buyer. Supplier B's view is illustrated in FIG. 5C. In this example, it is assumed that Supplier B's multiplicative and additive factors are, m=0.81 and b=82, respectively. In Supplier B's view, Supplier A's new bid of $17.01/ton (or 94.8 ¢/Million BTU) at 01:25:28 is fed back to Supplier B as a $15.80/ton bid (i.e., (94.8-82)/0.81=$15.80/ton) using Supplier B's multiplicative and additive parameters. In other words, from Supplier B's view, it must lower its bid to less than $15.80/ton (i.e., Supplier A's leading bid) in order to become the leading bidder.

In combination, FIGS. 5A-5C illustrate a feature of the present invention that enables each supplier to view the auction in his own context. These buyer-specific and supplier-specific contexts enable the system to create a coal auction market without revealing confidential information to the suppliers. The creation of an online electronic auction greatly benefits the buyer by allowing the buyer to get true market prices. The online electronic auction can easily produce hundreds of bids in a span of a few hours. This is in sharp contrast to traditional coal market mechanisms that rely upon the simultaneous occurrence of independent negotiations over a course of weeks.

In one embodiment, suppliers can view the auction "as-is" without detransformation. In other words, a supplier who bid x $ amount would see the exact same figure without any transformation or detransformation process performed on the figure.

In another embodiment, a supplier may simultaneously offer a plurality of products of differing technical specifications. In this case, the transformation function treats these offerings separately. Each offering has its own context, and an array of detransformed bid values unique to that offering.

In accordance with one aspect of the present invention, a supplier could modify its position, not only by changing a bid price, but also by changing a non-price parameter. For example, instead of changing the $/ton bid, a supplier could choose to change a particular characteristic (e.g., % ash, % sulfur, etc.) of the coal that is being bid. This new type of coal can be based upon a mixture or blend of different types of coal within the supplier's control. By adjusting the characteristics of the coal, the supplier is effectively adjusting non-comparative parameters (e.g., multiplicative factor and/or additive factor) that define its transformation function. For this reason, the new blend of coal would define a new context for that supplier. The supplier would then have the option of amending an existing offering or creating a second offering. If the supplier creates a new offering, viewing that new blended bid within the context of the auction market would require a second bid history chart. In effect, the supplier has entered two horses into the race. This has the additional benefit to suppliers of allowing them to balance their own supply with market demand in the most beneficial manner.

In other embodiments, the transformation function that converts the supplier comparative bid parameter into buyer comparative bid parameters may be non-linear. This non-linear transformation may be implemented in a variety of ways. In one embodiment, the algebraic transformation function (f) is defined as a non-linear function rather than a linear function. The form of this function may be a polynomial such as $y=nx2+mx+b$. It may also use logarithms or power functions.

Non-linear transformation functions can serve to provide additional emphasis to certain parameters. For example, a product's value may rise at a faster rate as a certain quality factor approaches perfection. The value of a perfect diamond, for example, can be many times higher than the value of a slightly imperfect diamond. However, as the level of imperfection rises, the drop off in value slows. This is a non-linear transformation from an engineering attribute into value.

In another embodiment, the transformation function (f) utilizes a reference function using one or more lookup tables. A lookup table is a form of transformation function whereby a given input value or range of input values is translated into a given output value. The lookup table is constructed in advance in such a way that all possible values of input are translated into an acceptable value of output. For example, consider the problem of translating FOB supplier prices into FOB buyer prices, including transportation costs between a supplier and a buyer. In theory, a linear transformation function might be used to apply an additive factor such as "cents per unit per mile shipped." In practice, it can be far simpler to prepare an auction using a rule such as "within 100 miles shipping is $0.01 per unit, between 101-250 miles shipping is $0.03 per unit, and above 250 miles shipping is $0.05 per unit." In this case, a lookup table provides an easier implementation. In this framework, supplier A located 60 miles from the buyer would be assessed $0.01 per unit for shipping, while supplier B located 105 miles from the buyer and supplier C located 230 miles away would both be assessed $0.03 per unit.

It should be noted that a combination of linear, non-linear, and reference (lookup) table transformations might apply to any given auction. For example, a linear transformation function might be used, where various additive transformation factors are themselves the output values from a lookup table, another linear function, or a non-linear function. In other words, the transformation functions may be nested to include more than one type of calculation in any given embodiment.

Generally, where the transformation function is non-confidential, the transformation process can be implemented individually or jointly by the auction server component and the individual client components. The joint implementation can be designed in various ways to achieve the same goal, the support of individual buyer and supplier views.

As noted, the transformation process can also be used in a context where only a single view of the auction is available. Here, the buyer and each of the participating suppliers each view the auction based on the buyer comparative bid parameter (e.g., net present value "NPV" bidding).

It should be apparent based on the foregoing description that the present invention creates true competition among suppliers in an auction system by factoring in non-bid price variables into the bid evaluation and award process. As noted above, industrial buyers generally purchase a group of similar components or parts in a lot. A lot, therefore, generally contains many components or parts that can be classified into one or more similar line items. A lot may include, for example, door handles. The selected supplier would use the requisite tools to process material into the door handles. Since each supplier has a unique tooling capacity (e.g., the number of existing tools in place already or the time it takes to implement the requisite tools to procure the lot), the tooling cost for each supplier may vary significantly.

Figure 6:
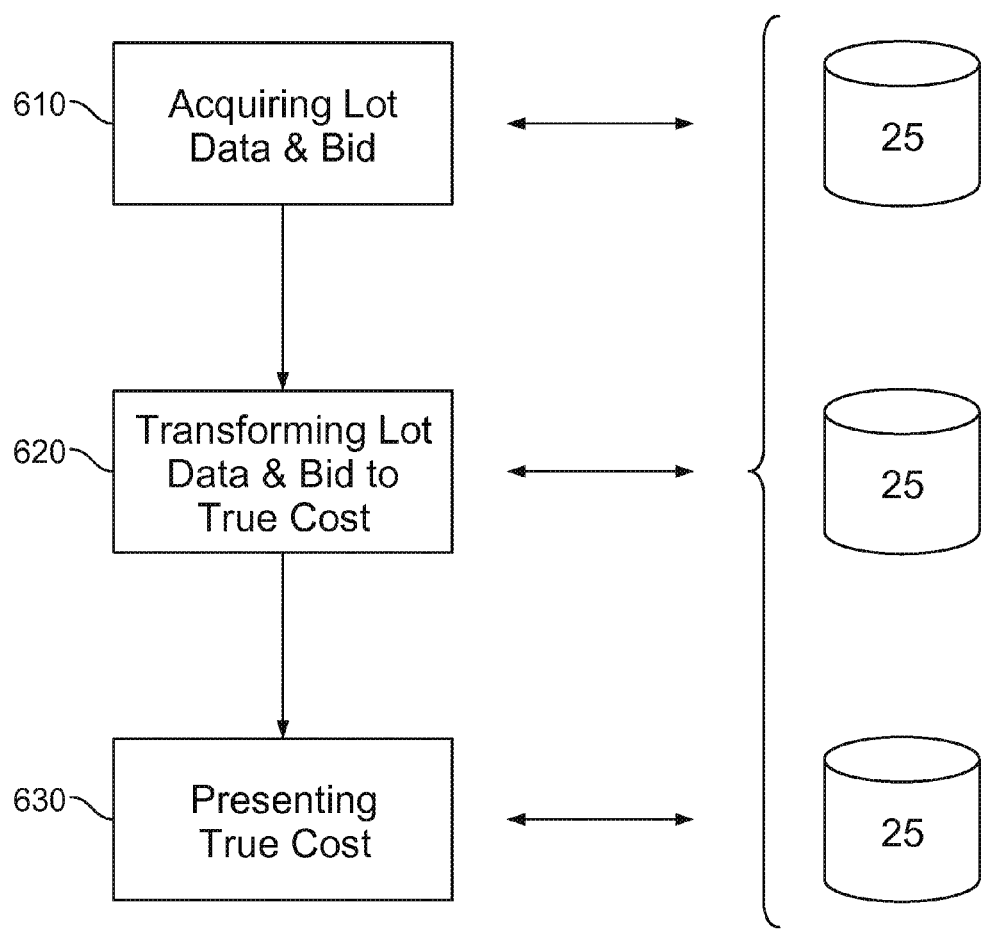
FIG. 6 is a flowchart illustrating one embodiment of the bid transformation function, in accordance with the present invention.

FIG. 6 shows a flowchart illustrating the steps of using one embodiment of bid transformation 500 shown in FIG. 4. In particular and in accordance with one aspect of the present invention, the embodiment of FIG. 6 applies the transformation function described with respect to FIGS. 1-5 above to transform several non-bid price variables, such as tooling information, to determine the true cost of procuring a lot from a particular supplier. Using real-time transformation of multiparameter factors into comparative units of measure, the embodiment of bid transformation 500 allows a buyer to readily determine the true cost of procuring a lot from any supplier.

As shown, in step 610, relevant information, such as lot data, which includes tooling information, and a bid, is gathered. Referring to FIG. 4, two types of input variables (i.e., non-comparative bid parameters and supplier comparative bid parameters) are used in bid transformation 500. In one embodiment of FIG. 6, comparative bid parameters (i.e., variable (x)) would obviously comprise a supplier's bid. Non-comparative input variables (i.e., variables ($a_1 \ldots a_n$)) would include the lot data. The lot data, as described in detail below, includes all relevant non-comparative input variables that can be used to determine the true cost of procuring a lot from any given supplier.

Traditionally, only bid prices would be used as units of measure. Thus, determining the true cost of procuring a lot would be nearly impossible, especially when there are many suppliers, each of which may offer different tooling costs. As noted above, industrial buyers typically purchase whole families of similar components in a single lot. That is, typical lot consists of several components or parts, some of which require certain works to conform to the buyer's specification. "Tooling" is required to provide the requisite work on the parts or components. Within the context of online auction, the term tooling may be defined as providing one or more tools that are needed for a supplier to render the requisite process or work on parts or components of the lot. For example, a buyer may need stampings processed to a certain specification, and a given supplier would need specific tools to produce or process the stampings that meet the specification. Any costs associated with tooling may be deemed tooling costs.

It is important to note that tooling cost represents a significant cost component and should be accounted for when choosing a supplier. Tooling cost may vary significantly from one supplier to another due to each supplier's unique tooling capacity. For instance, the length of period it takes to implement tooling may differ among all suppliers, and has significant impact on overall cost of procuring the lot. That is, the overall cost or true cost of procurement increases as the length of tooling implementation increases. Alternatively or additionally, a total number of existing and/or new tools required to procure a lot should be considered in deriving the overall cost. Accordingly, the embodiment of FIG. 6 transforms these non-comparative input parameters, along with comparative input parameters, into comparative output parameters, which can be used by a buyer to compare, in real-time, the true cost of procuring a lot from any given supplier, including an incumbent supplier or new supplier.

In accordance with one aspect of the present invention, the lot data includes information that is necessary to determine a switching cost for a lot. In essence, the switching cost represents the cost (to buyer) of switching suppliers—i.e., the cost of switching from an incumbent supplier to a new supplier to procure the lot. The switching cost may be formed of several cost components. When a buyer wants to change from an incumbent to a new supplier, the buyer needs to either purchase new tools or transfer the existing tools from the incumbent to the new supplier. Either way, the buyer may incur costs (i.e., tooling cost), which may not have been necessary if the buyer were to stay with the incumbent. As discussed further in detail below, determining tooling cost is essential, since it represents a significant portion of the switching cost. Thereafter, the buyer may assess the switching cost associated with any given supplier. If the switching cost is within acceptable limits, the buyer may switch from the incumbent supplier to the new supplier. In other words, the switching cost may be perceived as a barrier to entry to new suppliers: the higher the switching cost, the less likely the buyer would be willing to switch from an incumbent to a new supplier.

From a new supplier's perspective, it needs to overcome the incumbent's advantage of having lower initial tooling cost by minimizing other aspects the total cost. This can be done primarily in two ways. First, a new supplier may offer a very low bid price, which is low enough to offset the incumbent's advantage of having lower tooling costs. That is, while the new supplier's tooling cost may be higher than that of the incumbent, the new supplier may offer a lower overall cost. Second, the new supplier may attempt to minimize its tooling cost indirectly while bidding competitively. The new supplier can do this, for instance, by controlling other aspects of tooling costs, such as reducing the time it takes to implement the tooling requirement, which may eventually represent a significant saving to the buyer. By offering lower total costs—especially by reducing lower tooling costs—a new supplier has a legitimate chance to win a contract from the buyer.

Using transformation of non-comparative input variables, such as tooling information, into comparative output parameters, such as the true cost of procuring a lot from a particular supplier, a buyer can assess, in real-time, several suppliers using multiple criteria in addition to bid prices. Thus, the embodiment of FIG. 6 factors in and transforms tooling cost into the overall cost component of procuring the lot by considering all relevant lot data. Note that tooling information, which is included in the lot data, includes information relating to direct tooling cost and indirect tooling cost.

The direct tooling cost would relate to the cost of acquiring the requisite tools. Accordingly, tooling information would include the number of tools that are required to process or produce the lot and the number of tools to be transferred from existing supplier to new supplier. For instance, if the components or parts in a lot require new tools, the buyer should purchase the requisite tools. The cost of such tools would be transformed into the overall cost component. Thus, certain direct tooling costs, such as the average price of purchasing new tools and the average cost of moving the existing tools from one place to another, should be considered. If, however, the buyer already has the requisite tools, then there is no need to purchase new tools; rather, the existing tools would be transferred to a supplier, and the cost of moving or transferring should be transformed into the overall cost component. Note that an incumbent supplier may already have the possession of the tools. As such, there is no moving cost for the tools that the incumbent already has its possession should the incumbent supplier be selected to procure the lot. Thus, any information relating to the incumbent supplier and the number of existing tools (or even new supplier for that matter) is factored in to deriving the overall cost of procuring the lot.

While the direct tooling cost may be intuitive and obvious, the indirect tooling cost, on the other hand, may not be so obvious. The indirect tooling cost may represent all other aspects of the tooling cost other than the direct tooling cost. For instance, cost savings due to a particular supplier's capacity to implement the tooling requirement in a short period may be deemed a part of indirect tooling cost. Thus, in order to accurately derive tooling cost, the tooling information would include other relevant information, such as the incumbent historic information, the lot historical information, the lot current information, including the components or parts and the specification thereof, the supplier historical information, including tooling information of the supplier, certain buyer information, such as reserve price information and historical price information, the length of period required to implement the tooling, the interest rate, the amortization rate, the length of estimated period that the buyer wants to market (or sell, etc.) the components or parts of the lot, the length of period of a contract that governs terms and conditions of procuring the lot, the (average) supplier audit costs, and the Production Part Approval Process (PPAP) cost or first article inspection cost. The tooling information of a supplier may include, for example, the number of tools that the supplier has in its possession. Thus, using this information, the buyer can assess the number of additional tools, if any, that are required if the supplier is selected to procure the lot in question.

In accordance with one aspect of the present invention, acquiring the lot data, which includes bid data and tooling data, can be done in several ways. As noted above, much of the information can be received during the RFQ process. Recall that the specification may be prepared for each desired product or service (in a lot), and an RFQ may be generated for the auction. The RFQ, in accordance with one aspect of the present invention, may include the lot data. As noted, an RFQ may be in a tangible form, such as on paper, or in an electronic format. Using an electronic format, RFQ can be transmitted over network 40 (shown in FIG. 3). Alternatively or additionally, the lot data can be stored in one or more databases 25 stored by server component 23. Thus, during the auction process, the relevant information from the lot data can be retrieved from databases 25 and used to transform the bid price into a true cost bid. As shown in FIG. 6, therefore, one or more databases 25 can be accessed during the bidding process.

Once all relevant information is gathered, it is transformed into a comparative unit of measure in step 620. In the embodiment shown in FIG. 6, the comparative unit of measure is the true cost (in $) that represents the overall cost of procuring a lot from a particular buyer under several criteria, many of which represent buyer's goals or objectives. The true cost, as noted, represents the output comparative bid parameter (y) of bid transformation 500, shown in FIG. 4.

As noted above, the bid transformation function (f) may comprise performing, in real-time, one or more of a linear, non-linear, and reference function. As shown in FIG. 6, during the transformation process, one or more databases 25 may be accessed. This is so because it may be necessary to reference certain information from one or more lookup tables, such as a particular supplier's tooling information, that is stored in databases 25. Databases 25 may include one or more lookup tables listing cost data specifically corresponding to each one of the various tooling variations among suppliers. For instance, if a particular supplier has (5) tools and that twenty-two (22) tools are required to procure a particular lot, the lookup tables in databases 25 may contain specific cost data that relates to that situation. In yet another embodiment, the transformation function is a combination of an analytic linear function, analytic non-linear function, and table lookup function. The combination can be nested in more than one layer deep.

In accordance with one aspect of the present invention, the bid transformation function (f) of the embodiment in FIG. 6 includes a modular function using one or more planning models. The planning models can be any one of well-known modeling techniques using appropriate computer software, including spreadsheet programs, such as Microsoft® Excel and Lotus® 1-2-3, and financial modeling languages, such as SIMPLAN®. In one embodiment, the planning models include a financial model that utilizes forecasting analysis.

As noted, the planning models, in accordance with the present invention, are modular. The term "modular," as used in this disclosure, indicates that output (e.g., output comparative bid parameter) of a function, in its appropriate standardized unit of measure (e.g., $), can be easily modified or updated based on a set of input variables (i.e., input comparative and non-comparative bid parameters). Thus, by using all relevant input variables (e.g., the lot data including tooling information), it is possible to transform a simple supplier's bid for a lot into the true cost of procuring the lot from the buyer. Depending on the particular value or parameter of the variable, the output may be changed or updated, and hence the term "modular." For instance, based on the number of tools that a supplier has in its possession (recall that this information is included in the lot data), the true cost of procuring a lot from the supplier may vary.

As also noted, the planning models may utilize computer software, such as a spreadsheet program, to derive the output in real-time. In one embodiment, the planning models include a statistical model. The statistical model, in accordance with the present invention, may include a simple and/or multiple regression analysis model, time series model, risk analysis model, etc. The statistical model primarily utilizes current and historical lot data to derive statistical inferences and probabilities. By using historical information in a risk analysis model, for instance, it is possible to derive the cost of a risk premium for changing from a reliable incumbent supplier to unknown new supplier. The cost of the risk premium would be factored into the transformation process, and thus subsequently be transformed into part of the output parameter (i.e., the true cost).

In another embodiment, the planning models include a simulation model. One embodiment of the simulation model includes a "what-if-scenario" analysis. A what-if-scenario simulation model, in accordance with the present invention, is used to simulate the effects of alternative management policies and assumptions about the buyer's goals or objectives. As noted above, for instance, the lot data may include the length of a contract that governs the terms and conditions of procuring the lot from a particular supplier. The lot data may also include the time period required for implementing the total number of tools that are used to procure the lot. Using the what-if scenario simulation model, the buyer or sponsor can derive the true cost of procuring the lot under multiple scenarios in real-time by simply changing the length of a contract and/or the time period required for implementing the total number of tools.

In yet another embodiment, the planning models include an optimization model. An optimization model is, in general, an analysis tool that can be used to derive an output that minimizes (or alternatively maximizes) the buyer's goals or objectives, such as the true cost of procuring the lot. One embodiment of the optimization model, in accordance with one aspect of the present invention, includes a linear-goal-seek analysis model. A linear-goal-seek analysis model, in accordance with the present invention, attempts to find the true cost of procuring a lot at its minimum value. That is, the model seeks for the optimal combination of input variables that would result in the lowest true cost to the buyer. As noted, for instance, the lot data may include the interest rate and/or amortization rate.

Interest rate and/or amortization rate may be relevant for deriving the true cost in several situations. For instance, the buyer may want to procure a lot using borrowed funds as opposed to using its own funds. Likewise, the buyer may want to spread the payments for the lot over a period of one year or more as opposed to using a lump-sum cash up-front. Also, the buyer may wish to characterize the cost of procuring a lot for different purposes, such as for financial reporting purposes and federal income tax purposes. Furthermore, a contract term for procuring a lot may extend over several years. In this case, the buyer may wish to borrow funds if the cost of capital is more favorable to borrow than to use its own funds. It should be apparent based on the foregoing that interest rate and/or amortization rate may be highly relevant to the buyer.

Note that interest rate and amortization rate, along with the subsequent results to the true cost, may vary depending on several factors, such as the amount borrowed, the amount capitalized, the length of payback period, the internal rate of return, etc. Note that the lot data may also include the length of period that the buyer wants to market (or sell, etc.) the components or parts in a lot. By entering a specifically targeted goal (e.g., the true cost of procuring the lot for 24 months), the buyer can see whether it is more economically sound to pick one supplier over another, to amortize cash outlays as opposed to use lump-sum cash, to purchase new tools as opposed to transfer existing tools, etc.

It should be apparent based on the foregoing description that the planning models, in accordance with the present invention, provide a buyer with a powerful analysis tool that can be used to determine the true cost, including tooling costs, of procuring a lot from a particular supplier by using the real-time transformation of multi-parameter factors into comparative units of measure.

Figure 7:
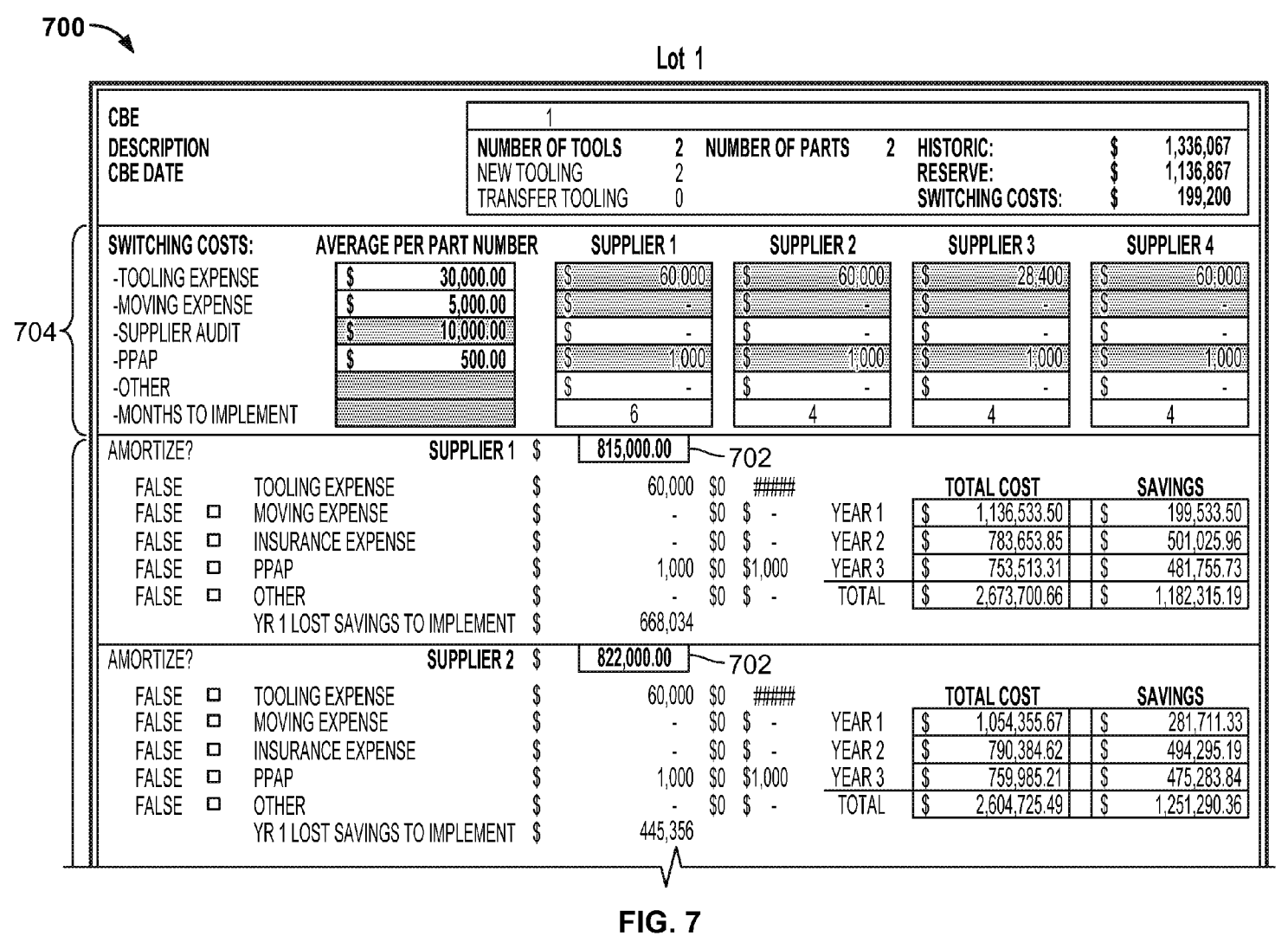

Referring again to FIG. 6, once the lot data and the bid are transformed into the true cost, it is presented to either auctioneer 20 or sponsor 10, in step 630. In accordance with one aspect of the present invention, the true cost can be presented in many forms, including in hard copy format, such as prioritized reports, and/or in electronic format, such a graphical user interface. FIG. 7 depicts an exemplary graphical user interface that can be used to present the true cost to sponsor 10. Graphical user interface 700 shows the true cost for six suppliers, which are shown in supplier analysis region 706. Each supplier's true cost is further broken into annual costs specific for year 1 through year 3.

Note that Supplier 3 is leading six suppliers with the total cost of $2,603,031.09. Further note that Supplier 1 has a lower bid price at $815,000.00, which is shown in bid price tab 702 for Supplier 1. Although its bid is lower than that of Supplier 3, Supplier 1 is not leading due to its tooling costs. For instance, as shown in switching cost analysis region 704, Supplier 3 can implement the tooling in four months as opposed to the six months associated with Supplier 1, and as such, Supplier 3 can procure the lot faster, resulting in a significant cost saving to the buyer. Furthermore, Supplier 3 already has some existing tools that can be used to procure the lot, thereby minimizing the cost of purchasing new tools. This can be seen in switching cost analysis region 704. Note that the tooling cost (or tooling expense) for Supplier 3 is $28,400 as opposed to $60,000 for Supplier 1.

It should be apparent based on the foregoing that graphical user interface 700 offers a buyer with a very powerful analysis tool that can be used to analyze all suppliers beyond their initial bid prices. Using the inventive features of the present invention, a buyer can analyze and derive the true cost, including the tooling cost, of procuring any lot from any supplier in real-time. Thus, the present invention facilitates the buyer to make informed decision, thereby allowing the buyer to minimize its expense relating to procuring the lot.

Referring again to FIG. 6, once the true cost is transformed and presented, it is used to update databases 25. This process ensures that databases 25 of the present invention maintain accurate and up-to-date information relating all buyers and suppliers along with all relevant tooling information.

While the invention has been described in detail and with reference to specific embodiments thereof, it will be apparent to one skilled in the art that various changes and modifications can be made therein without departing from the spirit and scope thereof. For example, while the auction functions described above have been described in the context of downward pricing (reverse) auctions, the auction functions can be equally applied to upward pricing (forward) auctions. Furthermore, while the description above generally focused on electronic auctions, the present invention can be used in a traditional auction setting. In fact, the present invention can also be used in a non-auction setting as well and be equally effective. Thus, it is intended that the present invention covers the modifications and variations of this invention provided they come within the scope of the appended claims and their equivalents.

What is claimed is:

1. A method of transformation bidding in an electronic auction system, comprising:
   acquiring lot data including tooling information for a lot, wherein the tooling information comprises information associated with one or more tools needed to supply at least one component of the lot, and wherein the tooling information comprises a time period required for implementing the one or more tools;
   receiving a bid from a bidder; and
   transforming, using a processor, the lot data and the bid into a true cost of procuring the lot from the bidder.

2. The method of claim 1, further comprising:
   presenting the true cost to a sponsor.

3. The method of claim 2, wherein the presenting comprises:
   providing at least one of a hard copy and a graphical user interface to the sponsor.

4. The method of claim 1, wherein the acquiring comprises:
   receiving the lot data from at least one of a sponsor and the bidder.

5. The method of claim 1, wherein the acquiring comprises:
   retrieving the lot data from at least one lookup table in at least one database.

6. The method of claim 1, wherein the transforming comprises:
   performing a linear function having at least one of a multiplicative adjustment and an additive adjustment.

7. The method of claim 1, wherein the transforming comprises:
   performing a non-linear function.

8. The method of claim 1, wherein the transforming comprises:
   performing a reference function using at least one lookup table.

9. The method of claim 1, wherein the transforming comprises:

performing a combination of a linear function, a non-linear function, and a reference function contemporaneously.

10. The method of claim 1, wherein the transforming comprises:
performing a modular function using at least one planning model.

11. The method of claim 10, wherein the performing comprises:
utilizing the planning model including a financial model.

12. The method of claim 11, wherein the utilizing comprises:
using the financial model including a forecasting model.

13. The method of claim 10, wherein the performing comprises:
utilizing the planning model including at least one of a statistical model, a simulation model, and an optimization model.

14. The method of claim 13, wherein the utilizing comprises:
using the simulation model including a what-if-scenario analysis.

15. The method of claim 13, wherein the utilizing comprises:
using the statistical model including a regression analysis.

16. The method of claim 13, wherein the utilizing comprises:
using the optimization model including a linear-goal-seek analysis.

17. The method of claim 1, wherein the tooling information comprises:
a total number of tools, the total number of the tools including at least one of a new tool and a tool to be transferred.

18. The method of claim 17, wherein the tooling information comprises a tooling cost, the tooling cost having a cost of at least one of the new tool and the tool to be transferred.

19. The method of claim 17, wherein the tooling information comprises a number of the tools the bidder needs to meet the total number of the tools required to procure the lot.

20. The method of claim 1, wherein the acquiring comprises:
including in the lot data a switching cost, the switching cost including at least one of: an average price of purchasing at least two new tools required to procure the lot, an average cost of moving a tool to be transferred to a new supplier to procure the lot, an average cost of performing a supplier audit, a cost of a Production Part Approval Process (PPAP), and a first article inspection cost.

21. The method of claim 1, wherein the transforming comprises:
deriving a net present value of the true cost for procuring the lot from the bidder for a period of at least one year.

22. The method of claim 1, wherein the acquiring comprises:
including in the lot data an interest rate of securing funds required to procure the lot.

23. The method of claim 1, wherein the acquiring comprises:
including in the lot data an amortization rate.

24. The method of claim 1, wherein the acquiring comprises:
including in the lot data a length of a contract, the contract including terms and conditions of procuring the lot.

25. The method of claim 1, wherein the acquiring comprises:
including in the lot data at least one of a historic price of procuring the lot and a reserve price for procuring the lot.

26. A system for transformation bidding, comprising:
a processor configured to:
acquire lot data including tooling information for a lot, wherein the tooling information comprises information associated with one or more tools needed to supply at least one component of the lot, and wherein the tooling information comprises a time period required for implementing the one or more tools;
receive a bid from a bidder; and
transform the lot data and the bid into a true cost of procuring the lot from the bidder; and
a memory configured to provide the processor with instructions.

27. The system of claim 26, wherein the processor is further configured to:
present the true cost to a sponsor.

28. A system for transformation bidding, comprising:
a database that stores tooling information, wherein the tooling information comprises information associated with one or more tools needed to supply at least one component of the lot, and wherein the tooling information comprises a time period required for implementing the one or more tools; and
a processor that acquires lot data, including the tooling information for a lot, receives a
bid from a bidder, transforms the lot data and the bid into a true cost of procuring the lot from the
bidder, and presents the true cost to a sponsor.

29. A computer program product for transformation bidding in an auction, the computer program product being embodied in a tangible medium and comprising computer instructions for:
acquiring lot data including tooling information for a lot, wherein the tooling information comprises information associated with one or more tools needed to supply at least one component of the lot, and wherein the tooling information comprises a time period required for implementing the one or more tools;
receiving a bid from a bidder;
transforming the lot data and the bid into a true cost of procuring the lot from the bidder; and
presenting the true cost to a sponsor.

* * * * *